Patented May 2, 1950

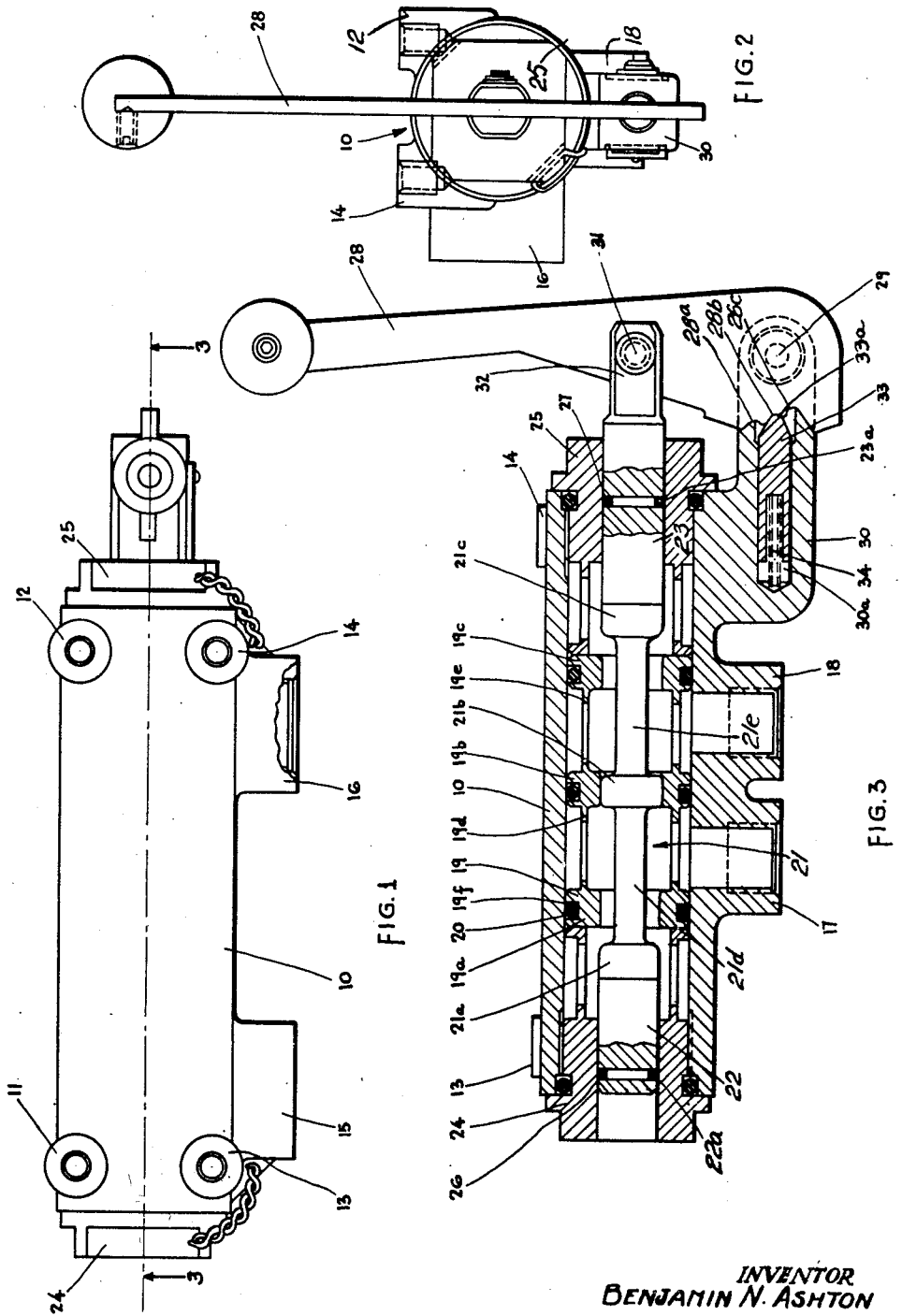

2,506,129

UNITED STATES PATENT OFFICE 2,506,129

SLIDE VALVE

Benjamin N. Ashton, Kingston, N. Y., assignor to Electrol Incorporated, Kingston, N. Y., a corporation of Delaware Application May 10, 1945, Serial No. 592,933

1 Claim. (Cl. 251—76)

This invention relates to valves, and it relates particularly to an improved form of selector valve for use in hydraulic systems for aircraft and the like.

The valves and other fittings that are used in aircraft hydraulic systems are subjected to relatively high pressures, for example 1,000 to 1,500 pounds per square inch, and, therefore, the elements of such systems ordinarily must be constructed of materials capable of withstanding these pressures. Steel or iron valves are usually quite bulky and heavy and thus add greatly to the weight of the hydraulic system. Aluminum cased valves have been used very widely in order to save weight, but such valves have been fitted with steel valve plugs and valve seats in order to render them capable of withstanding the conditions of their use. The steel parts require expensive machining operations in their manufacture and precision fitting within the lightweight casings in order to prevent leakage around the valve seats and stems.

All of these operations add greatly to the cost of the valves and decreases in weight are made only at greatly increased cost.

An object of the present invention is to provide lightweight selector and other types of light metal cased valves in which few machining operations are required in the manufacture and fitting of the wear-resisting parts.

Another object of the invention is to provide valves having easily machined wear-resisting parts that are readily fitted in light-weight casings.

A further object of the invention is to provide a lightweight valve having separate valve and casing elements that may be readily assembled and rendered leak-proof.

Other objects of the invention will become apparent from the following description of a typical device embodying the present invention.

Valves of the type embodying the present invention are characterized by a casing formed of aluminum or other light weight material having a sleeve mounted therein formed of a cast ferrous metal known as "Meehanite" which has characteristics similar to tool steel in so far as crystalline structure is concerned, but has a higher carbon content rendering it readily cast. "Meehanite" in certain of its forms is entirely pearlitic or sorbitic and can be machined readily.

More particularly, the valve sleeve is provided with inner and outer flanges forming, respectively, valve seats and partitions for separating the ports in the casing and confining the liquid to flow through the valve seat flanges. The sleeve construction being in contact with the casing only at the exterior flanges can readily be inserted in the casing and sealed thereto by means of suitable rubbery sealing rings mounted in grooves in the flanges opposing said casing. The sleeve can be of relatively thin wall construction except at the flanges, inasmuch as the walls of the sleeve are perforated to permit passage of the liquid and are subjected only to axial tension or compressive stresses.

The valve seats may be of any desired type, but preferably they are cylindrical openings for receiving piston-like valve plugs mounted on a plunger for movement together axially of the sleeve. The ends of the plunger are received in annular plugs in the ends of the casing and leakage is prevented therebetween by means of suitable groove and rubbery sealing ring assemblies.

Valves of the type described generally above are capable of withstanding high pressures and handling large volumes of liquid without being excessively heavy or bulky, and they may be produced without complicated and expensive machining operations or without the necessity of precision fitting, except between the valve plugs and valve seats. Moreover, the fitting of the valve and valve seat is greatly simplified inasmuch as this operation may be accomplished before the elements are assembled in the casing.

For a better understanding of the present invention, reference may be had to the accompanying drawing in which:

Figure 1 is a plan view of a typical form of valve embodying the present invention;

Figure 2 is a view in end elevation of the valve; and

Figure 3 is a view in cross section taken on line 3—3 of Figure 1.

The form of valve chosen for purposes of illustration is a four-port selector valve which may be utilized, for example, for controlling the flow of liquid to, and the discharge of liquid from, a hydraulic motor, such as, for example, a jack for operating retractable landing gear or wing flaps on an airplane. The valve can be used in many types of hydraulic systems and thus is not restricted to the above mentioned use.

The valve illustrated includes a generally cylindrical casing 10 which is provided at its upper surface with a plurality of tapped bosses 11, 12, 13, and 14, which may be utilized for connecting the casing to a panel or other device in position for convenient use. As best shown in Figures 1 and 3, the casing 10 is provided on one side with a pair of couplings 15 and 16 forming the ports that may be connected to a return conduit and a pressure conduit (not shown), respectively.

On the underside of the casing and between the ports 15 and 16 are two other ports 17 and 18 which may be connected respectively to other conduits for connection to the pressure sides of motors or the like. The ports 15, 17, 18, and 16 are spaced apart axially of the casing 10 so as to permit them to be separated and the flow of liquid therethrough controlled by the valve arrangement described hereinafter. Preferably, the casing 10 is formed of lightweight metal such as aluminum, magnesium, or in some cases, of plastic when high pressure fluids are not to be used in the system.

Inasmuch as such lightweight materials do not have good wear-resisting properties and thus valves made wholly of this material may leak after they have been in service for a period of time, the cooperating valve elements are formed of a harder and more durable material.

As shown in Figure 3, the casing 10 is adapted to receive a sleeve 19 that preferably is formed of the ferrous material known as "Meehanite" which is a form of cast iron having the properties similar to carbon tool steel. "Meehanite" is readily cast without being excessively brittle or so hard as to prevent easy machining thereof. The exact characteristics of "Meehanite" will vary, depending upon its uses, but generally speaking, it is a more homogeneous iron alloy than cast iron, being made up substantially entirely of pearlite or sorbite or a mixture of pearlite and sorbite and having a relatively high carbon content, that is, between 7 and 8½%, the carbon being distributed uniformly through the matrix of pearlite or sorbite.

The sleeve 19 can be cast generally in its final form and little extra finishing other than honing of certain parts thereof, to be described, is required.

The sleeve 19, as illustrated, includes three annular ring portions 19a, 19b, 19c which are connected by thinner perforated web portions 19d and 19e. The web portions 19d and 19e connect the annular portions at about their midpoints so that clearance is left between the webs 19d and 19e and the wall of the casing 10. The thickened annular portions project on opposite sides of these webs to form annular flanges projecting inwardly and outwardly from the sleeve.

The thickened annular portions 19a, 19b, and 19c are interposed between each of the pairs of ports 15 and 17, 17 and 18, and 18 and 16 and are arranged in sealing engagement with the casing 10 to prevent leakage of liquid from one port to another around the outside of the sleeve. This sealing may be accomplished by providing the exterior flange portions with peripheral grooves 19f, for example, in which are mounted toroidal rubbery sealing rings 20 which engage the wall of the casing 10. The exterior surfaces of the annular portions 19a to 19c may be ground to comparative smoothness so as to seat within the casing 10, but a precision fit is not required inasmuch as the rubbery rings 20 provide effective seals.

The inner surfaces of the annular rings 19a, 19b, and 19c are honed to precise dimensions inasmuch as they form the seats for the piston-like valve plugs 21a, 21b, and 21c which are connected by means of stems 21d and 21e to form a unitary valve assembly 21. The valve elements 21a, 21b, and 21c and the connecting stems may be formed of steel and are honed and ground to a precision fit in their respective seats in order to prevent leakage therebetween. The valve elements are spaced a greater distance apart than the valve seat rings 19a to 19c so that upon endwise shifting movement of the valve assembly 21, only one of the valve elements can be fully seated at a time. Inasmuch as the valve plugs 21a and 21c are both disposed outwardly of their respective valve seats, when the valve plug 21b is fully seated, it is possible to direct the fluid either through the supply port 16 to both of the ports 17 and 18 or to only the port 18, as desired, by shifting the valve assembly 21 axially, or to connect one or both of the ports 17 and 18 to the port 15.

In order to guide the valve assembly 21 in proper relationship to the sleeve 19, the ends of the valve assembly 21 may be provided with cylindrical plug portions 22 and 23 which are threaded or otherwise connected to the member 21 and are received in suitable sleeves 24 and 25 respectively that are threaded into the opposite ends of the casing 10. These plugs 24 and 25 as well as the cylindrical members 22 and 23 may be formed of aluminum or other light metal in order to reduce the weight of the valve. The plugs 22 and 23 may be provided with peripheral grooves 22a and 23a, respectively, for receiving rubbery sealing rings 26 and 27 to prevent leakage around the plugs.

The valve assembly 21 may be shifted endwise in any desired manner, for example, by means of cams or other actuating mechanism. As illustrated, the valve assembly 21 may be shifted by means of a lever 28 which is connected by means of a pivot pin 29 to an arm 30 which is formed integral with, or otherwise connected to, the casing 10. The lever 28 is further pivotally connected by means of a pivot pin 31 to a bifurcated portion 32 on the end of the cylindrical plug 23. The lever 28 may be provided with a plurality of notches 28a, 28b, and 28c which are selectively engageable with a pin 33 slidably supported in a bore or recess 30a in the arm 30 and urged outwardly by means of the spring 34. The pin 33 has a rounded nose 33a which may engage in any of the notches 28a to 28c to retain the lever in any of three positions. These positions correspond to the axial position of the valve assembly 21 necessary to seat the plugs 21a to 21c in their seats 19a to 19c, respectively. An elongated slot in the lever 28 may be provided for receiving the pin 31 to prevent the lever from binding.

The above described valve construction is light in weight inasmuch as the major portion of the valve is formed of relatively lightweight material, while only the parts subjected to wear and erosion are formed of harder and more durable heavier metals. Thus, only the valve assembly 21 and the sleeve 19 need be made of "Meehanite" and steel and the sleeve, except for the annular portions 19a, 19b, and 19c may be relatively thin, inasmuch as these portions are not subjected to stresses other than tension and compression stresses axially of the sleeve 19.

The valve may be assembled very easily inasmuch as the sleeve 19 engages the casing at only three zones, and the sealing rings 20 provide an effective seal with a relative coarse fit between the sleeve and the casing. The valve assembly 21 may be fitted to the sleeve 19 before it is mounted in the casing and, therefore, the whole valve may be produced with a minimum of machining operations and may be assembled with a minimum amount of skill.

It will be understood that the valve is susceptible to considerable modification both in the number of ports and in the number of valve elements therein. Moreover, the type of valve plugs and valve seats may be modified as desired for various purposes without departing from the invention.

Therefore, the form of valve described above should be considered as illustrative of the invention and not as limiting the scope of the following claim.

I claim:

A selector valve comprising a sleeve of hard wear-resistant metal having a plurality of radially aligned inwardly and outwardly projecting annular flanges, said inwardly projecting flanges forming axially aligned cylindrical valve seats, said annular flanges being connected at about their midpoints by thinner perforated web portions and said outwardly projecting flanges having circumferential grooves therein, a tubular casing of light weight metal engaging said outwardly projecting flanges on said sleeve, rubbery sealing rings in the grooves of said flanges sealing said flanges to said casing, a valve plunger of hard wear-resistance metal extending through and movable axially of said aligned seats and having enlarged spaced apart cylindrical valve plugs selectively engageable in said valve seats, cylindrical plunger portions of light weight metal fixed to opposite ends of said valve plunger and provided with grooves thereon, sealing rings in said grooves, means in said casing forming ports on opposite sides of said outwardly projecting flanges, annular plugs of light weight metal threaded into opposite ends of said casing slidably receiving the cylindrical plunger portions in sealing engagement with the rings in the grooves of said plunger portions, said plugs having thin perforated tubular portions thereon engaging opposite ends of said sleeve to retain it against axial movement in said casing, and means on said casing for sliding said plunger axially to engage said plugs selectively with said valve seats.

BENJAMIN N. ASHTON.

REFERENCES CITED

The following references are of record in the file of this patent:

UNITED STATES PATENTS

| Number | Name | Date |
|---|---|---|
| 1,099,483 | Bayles | June 9, 1914 |
| 1,172,595 | Heath | Feb. 22, 1916 |
| 2,184,793 | Clench | Dec. 26, 1939 |
| 2,342,450 | Campbell | Feb. 22, 1944 |
| 2,380,836 | Gottlieb | July 31, 1945 |
| 2,396,643 | De Ganahl | Mar. 19, 1946 |
| 2,414,451 | Christensen | Jan. 21, 1947 |
| 2,445,855 | Majneri | July 27, 1948 |